United States Patent
Orcutt et al.

(10) Patent No.: US 7,414,503 B1
(45) Date of Patent: Aug. 19, 2008

(54) TORSIONAL HINGED DEVICE WITH IMPROVED COUPLING BETWEEN A MAGNET MOUNTED TO SAID DEVICE AND AN ELECTRICAL COIL

(75) Inventors: John W. Orcutt, Richardson, TX (US); Mark W. Heaton, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 11/934,570

(22) Filed: Nov. 2, 2007

(51) Int. Cl.
*H01F 7/08* (2006.01)
*G02B 26/08* (2006.01)

(52) U.S. Cl. .................. 335/229; 335/275; 335/276; 359/196; 359/223; 359/224

(58) Field of Classification Search ............. 335/229, 335/275, 276; 359/196, 220–226
See application file for complete search history.

(56) References Cited

U.S. PATENT DOCUMENTS 6,731,420 B2 * 5/2004 Orcutt et al. ............ 359/223

* cited by examiner

*Primary Examiner*—Ramon M Barrera
(74) *Attorney, Agent, or Firm*—William B. Kempler; W. James Brady, III; Frederick J. Telecky, Jr.

(57) ABSTRACT

A pivoting device such as a MEMS mirror provides improved coupling between a permanent magnet on the device and an adjacent electrical coil that may provide a drive force or position sensing. The improved coupling is obtained by forming a cavity in the coil structure. The cavity receives the permanent magnet such that the spacing between the magnet and the electrical windings or coil is at a minimum.

25 Claims, 6 Drawing Sheets

TORSIONAL HINGED DEVICE WITH IMPROVED COUPLING BETWEEN A MAGNET MOUNTED TO SAID DEVICE AND AN ELECTRICAL COIL

TECHNICAL FIELD

The present invention relates generally to the field of torsional hinged Micro Electro Mechanical Systems (MEMS) oscillating devices. More particularly, the invention relates to an arrangement to improve the coupling between a permanent magnet attached to the pivoting device and an electrical coil. The magnet and coil arrangement can be used to accurately sense the rotational position of the pivoting device, or alternately the arrangement can provide the drive power to pivot or oscillate the device.

BACKGROUND

Torsional hinged mirrors are now being used as scanning mirrors in laser printers to provide a beam sweep or scan of the image of a modulated light source across a photoresist medium, and as pointing mirrors for redirecting a light beam to one or more specific locations. Devices supported by torsional hinges, other than mirrors may also benefit from this invention. Torsional hinged devices that use silicon for the hinges provide excellent performance at a very advantageous cost and with a very long life, since material fatigue is almost non-existent in torsional hinge devices made of silicon. Magnetic coupling between a permanent magnet on a torsional hinged structure and an electrical coil positioned close to the permanent magnet may be used to provide a drive force to pivot or oscillate the device, or the electrical coil may generate an output signal as the magnet moves with respect to the coil. The output signal will be indicative of the rotational position of the torsional hinged device.

However, as will be appreciated by those skilled in the art, the drive force resulting from electrical signals applied to the electrical coil, or the sensed electrical signals generated as the permanent magnet moves with respect to the electrical coil diminishes as a function of the square of the distance between the magnet and the electrical coil.

Therefore, methods and structures that reduce this distance without a corresponding decrease in structural strength or an increase in complexity or cost would be advantageous.

SUMMARY OF THE INVENTION

The problem of reducing the distance between the permanent magnet and the associated electrical coil is generally solved or circumvented, and technical advantages are generally achieved, by the embodiments of the present invention which provide a pivoting device or assembly with improved coupling between a permanent magnet attached to the device and an electrical coil.

The assembly comprises an elongated hinge layer having a front side and a back side and a first end and a second end. The elongated hinge layer defines a pivoting structure comprising a pair of torsional hinges extending along a pivot axis, a magnet support area at a first location on the back side of the pivoting structure, and a functional support area at a second location of the pivoting structure. According to one embodiment of the invention, the magnet support area and the functional support area are spaced apart such that a functional surface such as a mirror may be on the front side, the back side, or even on both the front and back side, whereas according to another embodiment, the magnet and functional surface are back to back.

The pivoting structure is supported by the torsional hinges so that the structure pivots about the pivot axis. A permanent magnet is attached to the hinge layer at the magnet support area on the back side of the hinge layer and an electrical coil is positioned proximate to the permanent magnet such that a magnetic coupling exists between the two. The electrical coil structure comprises a coil support having a top surface that defines a cavity extending to a selected depth level. The coil support further defines a windings area having a multiplicity of electrical windings with the topmost winding at a level at about the selected depth of the cavity. A support structure supports the pivoting structure so that the permanent magnet attached to the hinge layer is located at least partially within the cavity.

The foregoing has broadly outlined the features of the present invention in order that the detailed description of the invention that follows may be better understood. Additional features and advantages will be described hereinafter, which form the subject of the claims of the invention. It should be appreciated by those skilled in the art that the conception and specific embodiments disclosed may be readily utilized as a basis for modifying or designing other structures or processes for carrying out the same purpose of the present invention. It should also be realized by those skilled in the art that such constructions do not depart from the spirit or scope of the invention as set forth in the appended claims.

BRIEF DESCRIPTION OF THE DRAWINGS

For a more complete understanding of the present invention, and the advantages thereof, reference is made to the following descriptions taken in conjunction with the accompanying drawings, in which:

FIGS. 2A-2B illustrate that various shapes of permanent magnets may be used. For example, a square shaped and a round shaped permanent magnet may be used in different embodiments;

DETAILED DESCRIPTION OF ILLUSTRATIVE EMBODIMENTS

The making and using of the described embodiments are discussed in detail below. It should be appreciated, however, that the present invention provides many applicable inventive concepts that can be embodied in a wide variety of specific contexts. The specific embodiments discussed are illustrative of specific ways to make and use the invention, and should not limit the scope of the invention.

Figure 1:
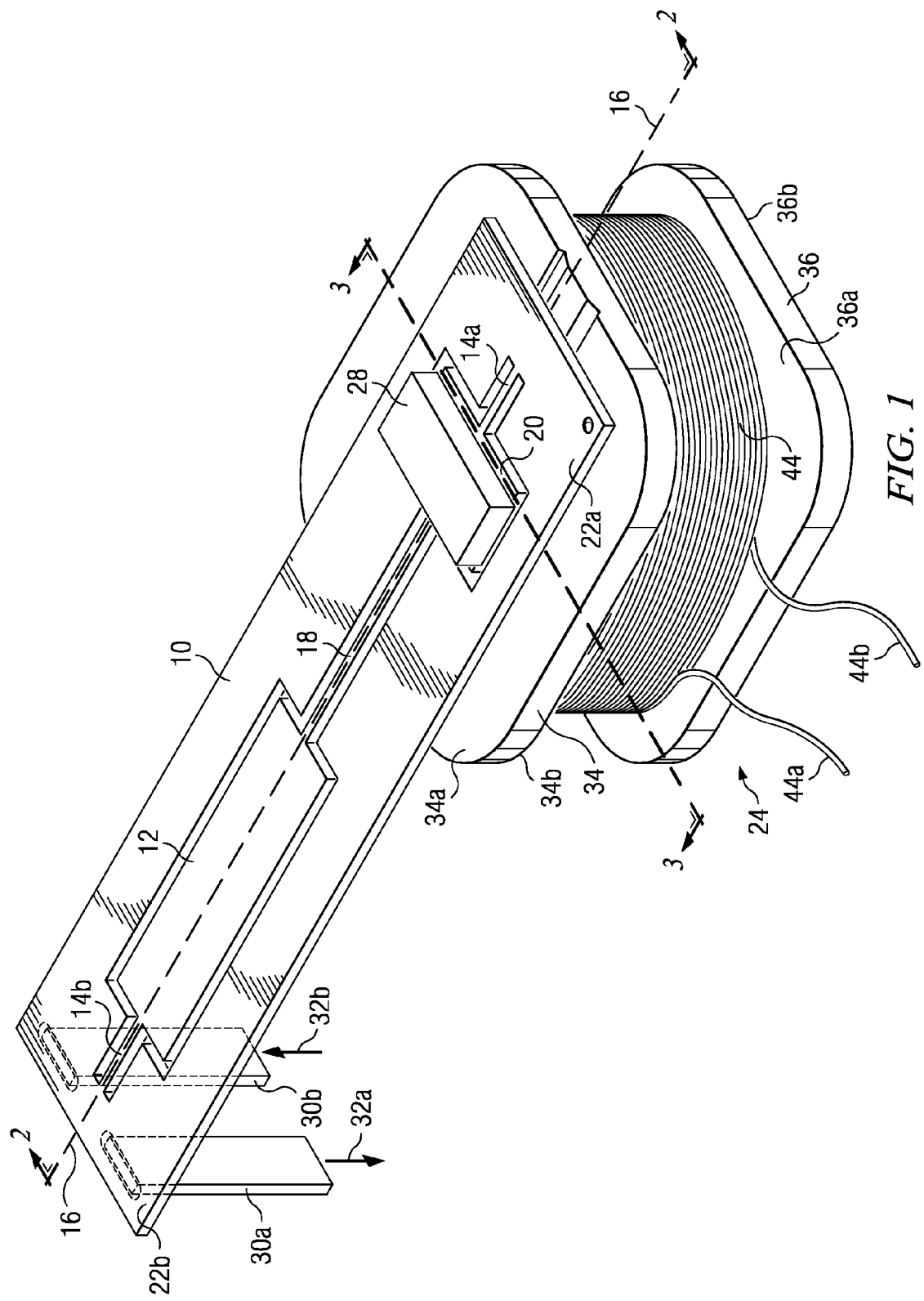
FIG. 1 is a perspective view of a preferred embodiment of the invention.

Referring now to FIGS. 1A and 1B there is illustrated a pivoting device incorporating the teachings of the present invention. As shown, the device comprises an elongated hinge layer 10 defining a pivoting structure having first and second torsional hinge members 14a and 14b that extend along a pivot axis shown as dotted line 16. Torsional hinges 14a and 14b are attached to and support a functional oscillating device or area 12 such as, for example a mirror which may be located on the front side, or the back side or even both the front and back side. According to the embodiment of FIG. 1 torsional hinges 14a and 14b also support a connecting member 18 and a permanent magnet area 20. An end portion 22a of the hinge layer is supported by a coil support structure 24. The elongated hinge layer includes a front side visible in FIGS. 1, 2 and 3 and a back side that is hidden in these figures. A permanent magnet 26 illustrated in FIGS. 2, 3, 4A, 5A and 5B is attached to the back side of the permanent magnet area 20 of the hinge layer 10. An optional counterweight 28 may be attached to the front side of the permanent magnet area 20 to keep the moment center of the device on the pivot axis 16. The end portion of 22b of hinge layer 10 opposite coil support structure 24 may be supported by mechanical support, such as a pair of support structures 30a and 30b. Alternately, a single support structure could be used rather than the two structures indicated. Support structures 30a and 30b may simply provide mechanical support, or alternately support structures 30a and 30b may be piezoelectric elements that provide the energy to pivot the torsional hinge supported structure by expanding and shrinking out of phase as indicated by arrows 32a and 32b.

Figure 2:
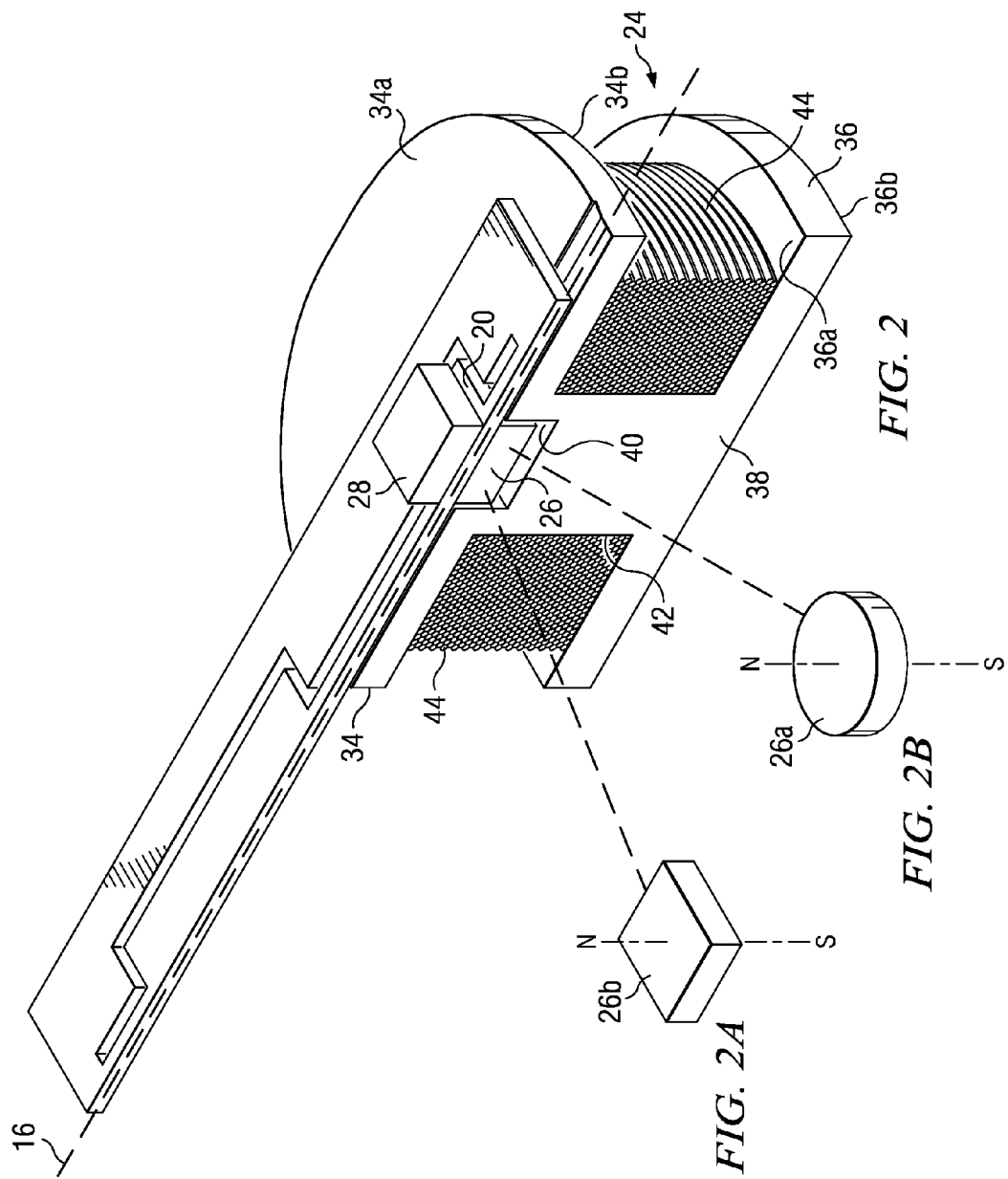
FIG. 2 is a cross-sectional perspective view along line 2-2 of FIG. 1.
Figure 3:
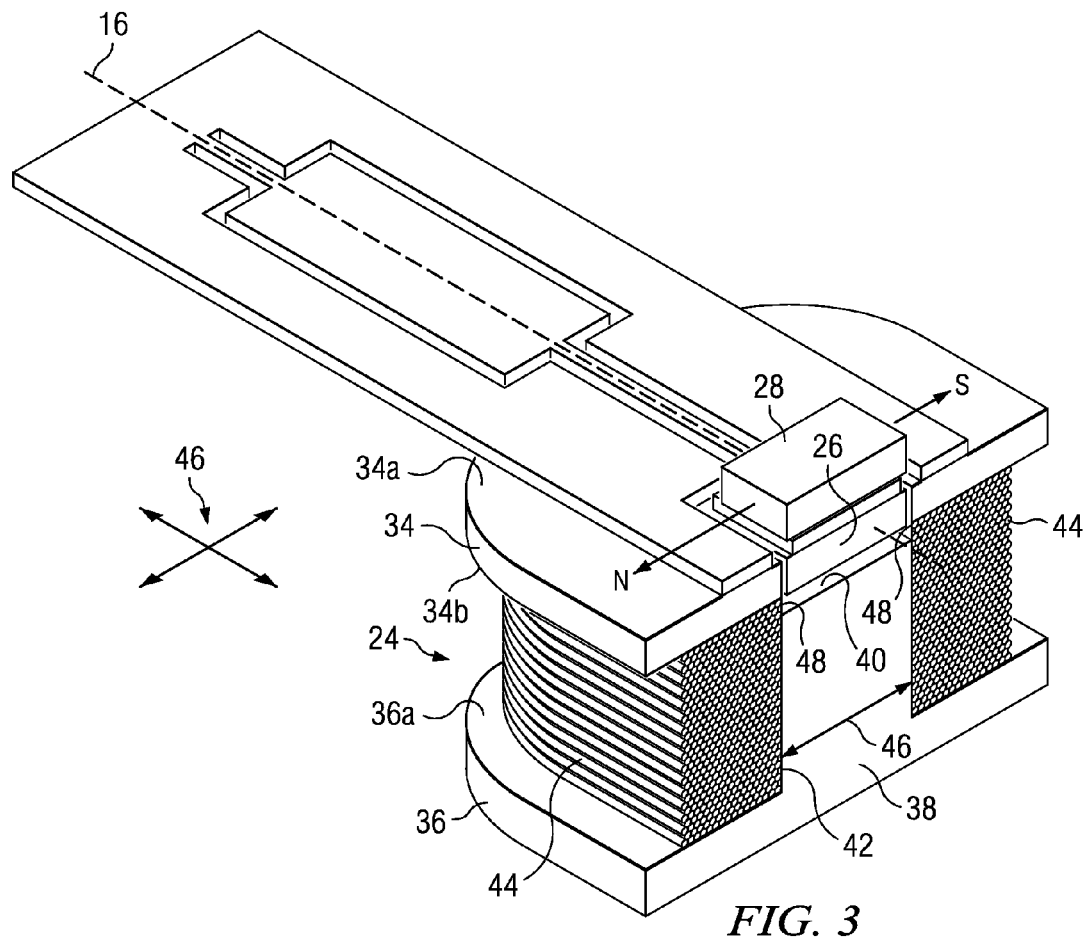
FIG. 3 is a cross-sectional perspective view along line 3-3 of the embodiment of FIG. 1.
Figure 4A:
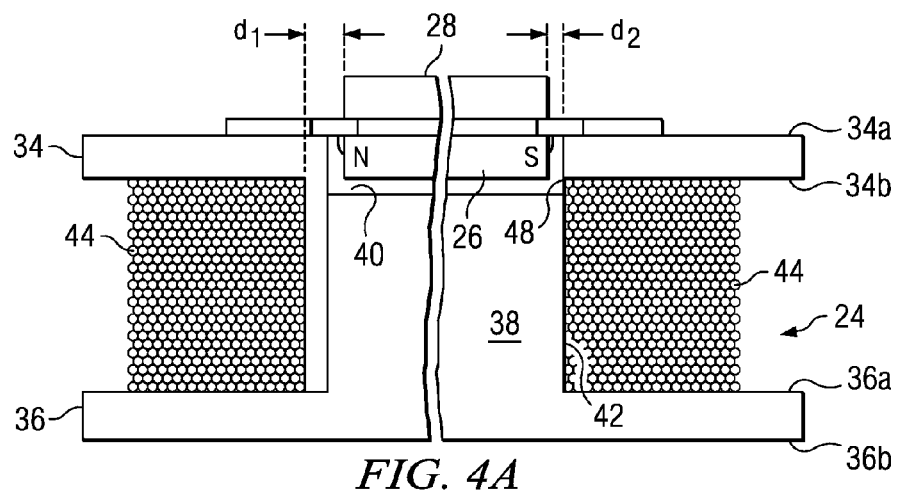
FIG. 4A is a cross-sectional view showing the electrical windings of the preferred embodiment of FIG. 1 on the right side and an alternate embodiment on the left side.
Figure 4B:
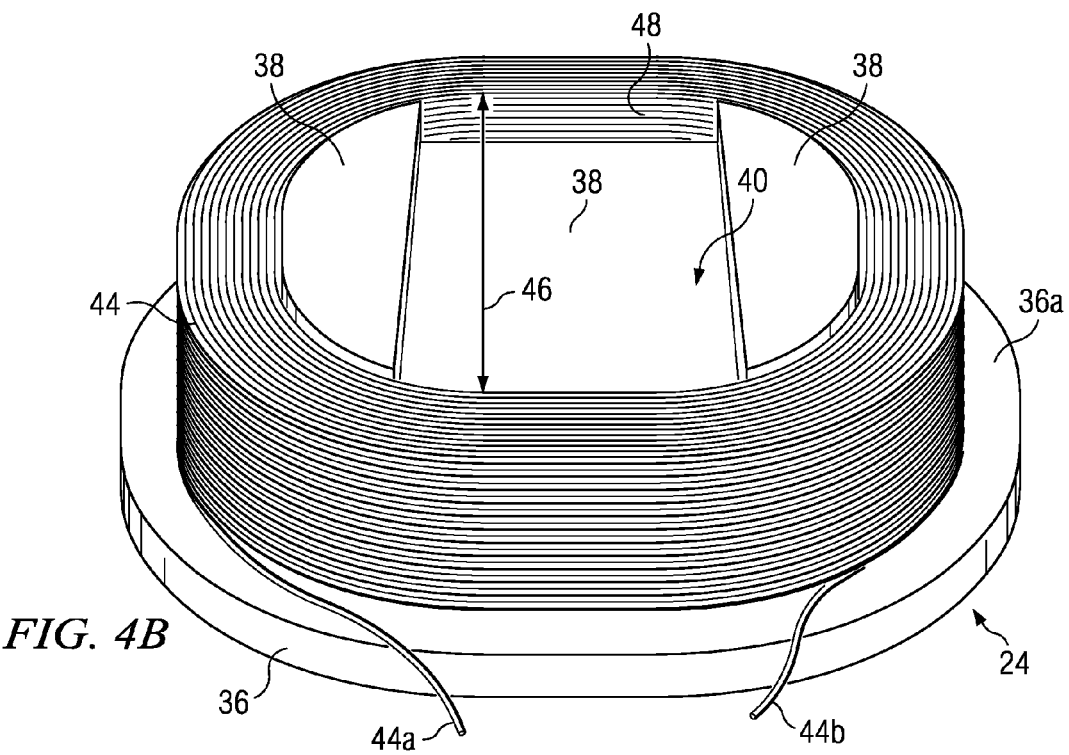
FIG. 4B is a perspective cross-sectional top view of the preferred embodiment of FIG. 1 illustrating the top most windings around the core member.

As shown in the Figures, the coil support 24 is preferably a molded or machined plastic spool shaped structure having a top member 34 with a top surface 34a and a bottom surface 34b. As is clearly seen in FIGS. 2 and 3, the top member 34 is connected to a bottom member 36 that also includes a top surface 36a by a core member 38. A cavity 40 is formed in the top surface 34a of the top member 34 to provide space for the permanent magnet 26. Coil support 24 also defines a windings area 42 between the bottom surface 34a of top member 34 and the top surface 36a of bottom member 36. A multiplicity of electrically conductive windings 44 are located in the windings area 42 by repeatedly winding a wire or electrical conductor around the core member 38. The two endings 44a and 44b of the wire are shown in FIGS. 1 and 4B, and as will be appreciated by those skilled in the art, the coil may function as a drive coil by connecting an alternating electrical voltage across the two endings 44a and 44b to create a magnetic field that will interact with the permanent magnet 26. This interaction will cause pivoting movement of the magnet and the other portions of the torsional hinge supported pivoting device defined in hinge layer 10. Alternatively the windings or coil may function as a sensing coil that provides an electrical output signal that indicates the rotational position of the magnet as it pivots about the torsional hinge. Permanent magnet 26 of the preferred embodiment illustrated by FIGS. 1, 2 and 3 is rectangular shaped with a North-pole/South-pole orientation that is orthogonal to the pivot axis 16 and in a plane parallel to the hinge layer. It will however, be appreciated that the permanent magnet may also have a North-pole/South-pole orientation that is perpendicular to the plane of the hinge layer as illustrated by the square and disk shaped permanent magnets 26a and 26b of FIG. 2.

Figure 7:
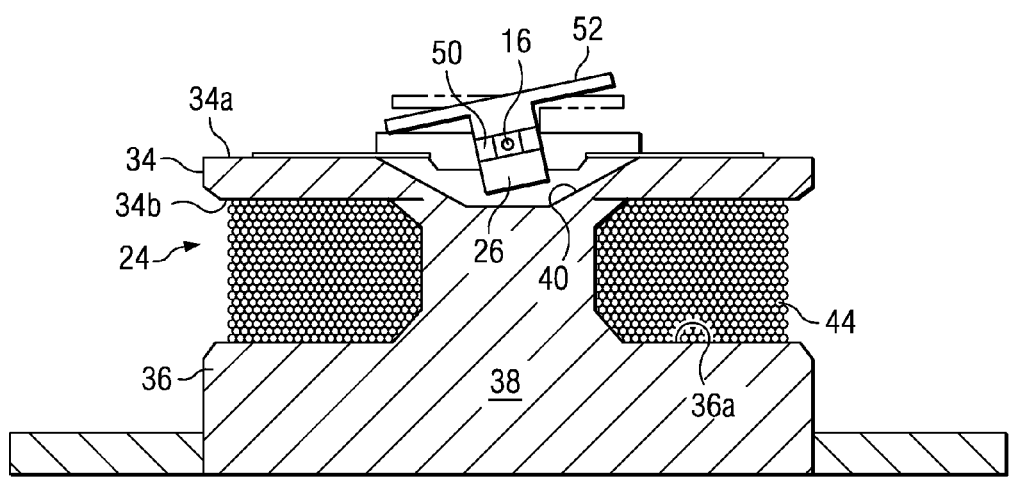
FIG. 7 illustrates details of the windings and the pivoting member of the embodiment of FIG. 6.

As will be appreciated by those skilled in the art, the magnetic coupling between a permanent magnet and an electrical coil varies as the square of the distance between the two. Therefore, for the best magnetic coupling, it is important to locate the permanent magnet 26 close to coil or conductive windings 44. A first technique to decrease the distance, according to the invention, is to form cavity 40 in the top member 34 as discussed above and as is clearly shown in FIGS. 2, 3 and 7. However, it has been found that although the distance can be decreased and the magnetic coupling improved by forming a cavity to receive the permanent magnet, such as shown in FIG. 7, for some applications further improvement is needed. Therefore, referring to FIGS. 3, 4A and 4B there is shown an arrangement that further improves the magnetic coupling. Referring to 4B, there is shown a coil support 24 and conductive windings 44 according to the preferred embodiment of the invention. As shown in the FIGS. 2, 3, 4A and 4B a cavity 40 that is formed in spool shaped coil support 24 is rectangular and has a first dimension as represented by double headed arrow 46 in FIGS. 3 and 4B that can be selected to be either parallel to or perpendicular to the pivoting axis 16. FIG. 4B shows an embodiment wherein the first dimension 46 of cavity 40 is perpendicular to the pivoting axis 16, and is equal to the thickness of the core member 38 of coil support structure 24. Consequently, the top most windings 44 do not have any core material between the magnet and the windings in the cavity dimension 46. Note especially areas 48 of FIGS. 3, 4A (right side) and 4B. Alternately, the first dimension 46 of cavity 40 may be only slightly less than the core thickness such that the remaining material is reduced, but not completely removed. Thus, the pole ends of the permanent magnet 20 are still located much closer to the windings. The difference is clearly illustrated in FIG. 4A which shows on the left side a cavity with a first dimension that is slightly less than the core material thickness such that the cavity does not extend completely through the core material. Consequently, the remaining material is reduced. The right side of FIG. 4A shows that forming the cavity with a first dimension that is equal to the core thickness, removes such that the top most windings are exposed as shown at area 48. FIG. 4A also illustrates that the distance $d_2$ (i.e. when the first cavity dimension is equal to the core) between the windings and the end of the magnet end is smaller than the distance $d_1$, (where the core material is either thinned or not changed).

Figure 5A:
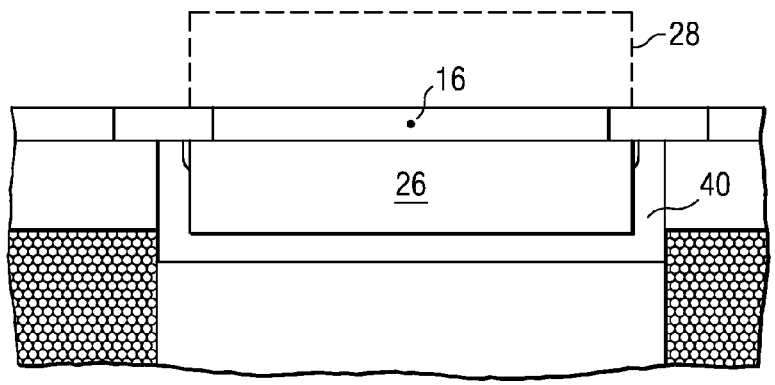
FIGS. 5A-5B illustrate the rotation of the permanent magnet of the preferred embodiment of FIG. 1.
Figure 5B:
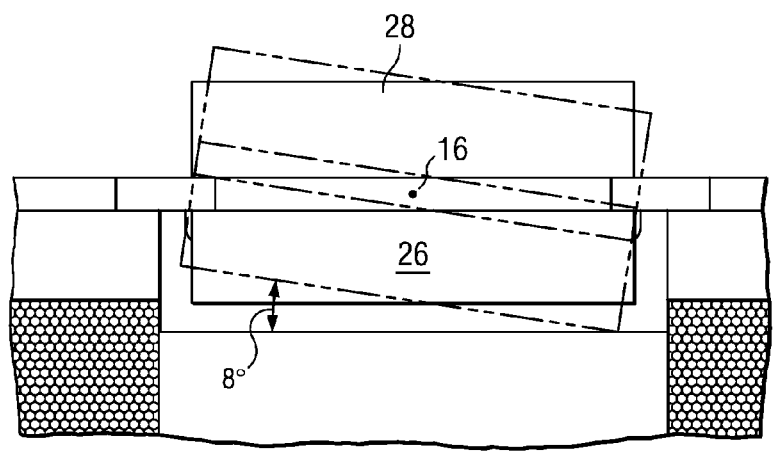

FIGS. 5A and 5B illustrate the rotations of the permanent magnet 26 and counterweight 28 around pivot axis 16 of the embodiment of FIG. 1. In a preferred embodiment the maximum angle of rotation is about 8° as shown in FIG. 5B.

Figure 6:
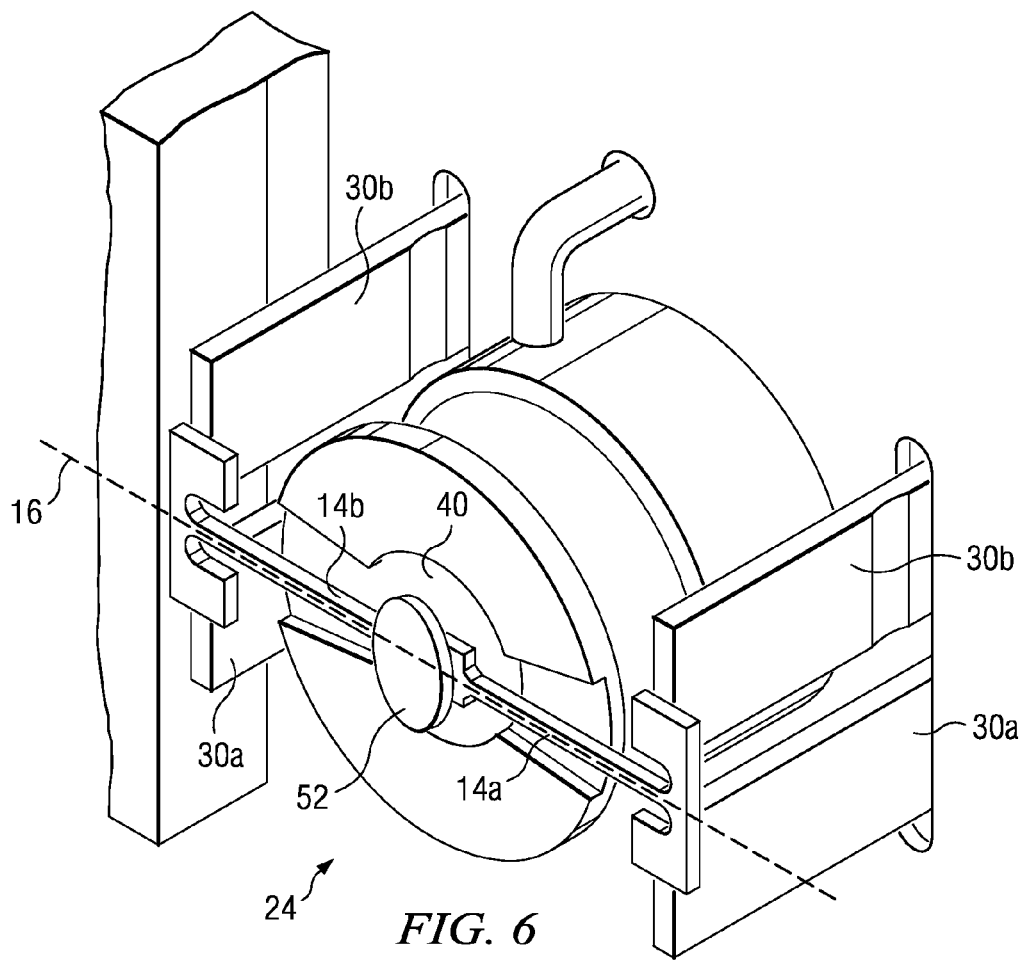
FIGS. 6 and 6A illustrate a perspective view and a perspective cross-sectional view of another embodiment of the invention.
Figure 6A:
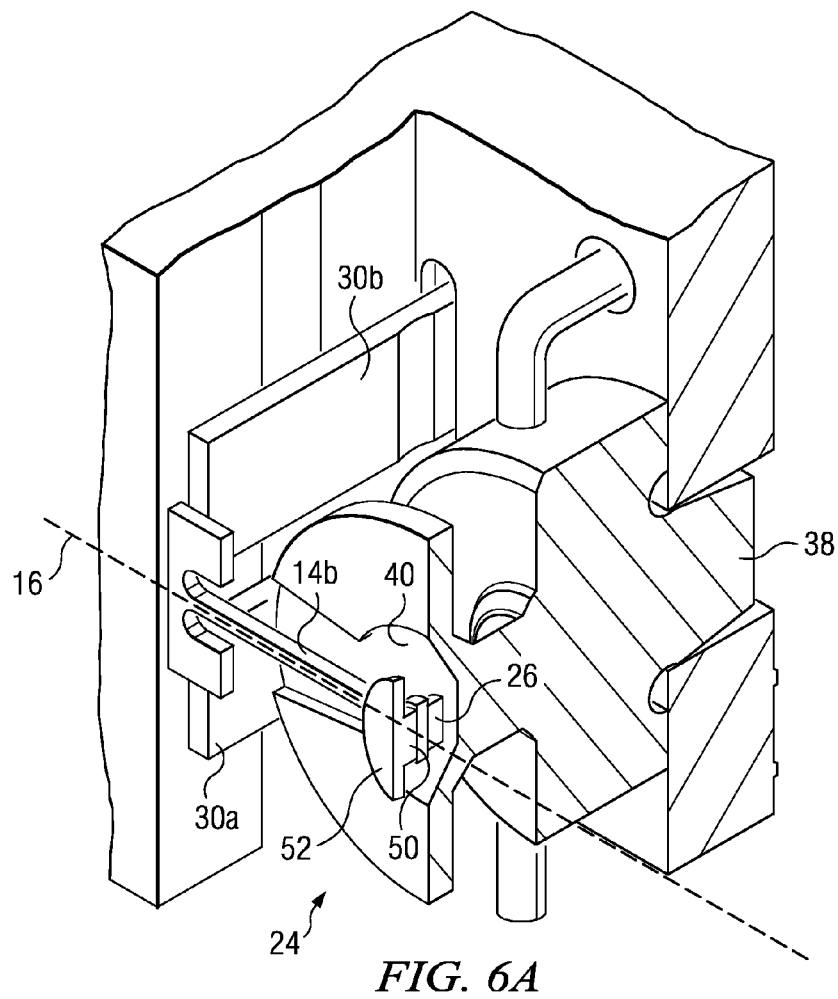

Referring to FIGS. 6, 6A and 7 there is shown another embodiment of the invention that incorporates a cavity 40 that does not remove sufficient core member material to expose the top most core windings. Elements of the embodiment of FIGS. 6, 6A and 7 that are the same as discussed above with respect to the embodiment of FIG. 1 carry the same reference number. As shown, there is a pivoting device that includes improved coupling between a permanent magnet 26 (FIGS. 6A and 7), and an electrical coil 44 wound on a coil support structure 24. The device includes an elongated hinge layer having a front side and a back side and first and second torsional hinge members 14a and 14b that extend along a pivot axis 16. Each of the torsional hinges, such as hinge 14b formed in said hinge layer include a first end attached to a function support area or member and a second end attached to a support structure. The support structure may simply provide mechanical support, or may comprise two pairs of piezoelectric elements 30a and 30b for providing a drive force to pivot the device. The function support member typically will include a mirror 52 attached to the front side of the functional support member 50. The permanent magnet 26 is attached to the back side of the functional support area or member 50. The spool shaped coil support structure 24 includes a top member 34 having a top surface 34a and a bottom surface 34b. Also included is a bottom member 36 with a top surface 36a. A core member 38 connects the top member 34 and the bottom member 36. A cavity 40 of a selected depth is defined in the top surface 34a of a top member 34, and a wire or conductor is continuously wrapped around the core member 38 to form windings 44 between the bottom surface 34b of top member 34 and the top surface 36a of bottom member 36. The selected depth of cavity 40 extends into the top member 36 and core member 38 to a level that is preferably below the top most windings.

Although the present invention and its advantages have been described in detail, it should be understood that various changes, substitutions, and alterations can be made herein without departing from the spirit and scope of the invention as defined by the appended claims.

Moreover, the scope of the present application is not intended to be limited to the particular embodiments of the structure, methods, and steps described in the specification. As one of ordinary skill in the art will readily appreciate from the disclosure of the present invention, such structures, methods, and steps presently existing or later to be developed, that perform substantially the same function or achieve substantially the same result as the corresponding embodiments described herein may be utilized according to the present invention. Accordingly, the appended claims are intended to include within their scope such structure, methods, and steps.

What is claimed is:

1. A pivoting device with improved coupling between a permanent magnet attached to the device and an electrical coil, the pivoting device comprising:
    an elongated hinge layer having a front side and a back side and a first end and a second end, said hinge layer defining a pivoting structure comprising a pair of torsional hinges extending along a pivot axis, a magnet support area at a first location on said back side of said pivoting structure, and a functional area at a second location of said pivoting structure, said pivoting structure supported by said torsional hinges so as to pivot about said pivot axis;
    a permanent magnet attached to said hinge layer at said magnet support area on said back side;
    a coil support having a top surface defining a cavity extending to a selected depth level, said coil support further defining a windings area;
    a multiplicity of electrical windings in said windings area, said electrical windings having top most windings at a level no lower than, the selected depth of said cavity; and
    a support structure for supporting said pivoting structure such that said permanent magnet attached to said hinge layer is located at least partially within said cavity.

2. The pivoting device of claim 1 further comprising a mirror surface at said functional area.

3. The pivoting device of claim 1 wherein said top most windings surround said cavity.

4. The pivoting device of claim 1 further comprising a counter balancing weight mounted on said front side of said pivoting structure opposite said permanent magnet.

5. The pivoting device of claim 1 wherein said first and second locations of said pivoting structure are spaced apart from each other.

6. The pivoting device of claim 5 wherein said functional area is on either said front side or said back side.

7. The pivoting device of claim 5 wherein said functional area is a pair of mirror surfaces located one each on said front and back surfaces.

8. The pivoting device of claim 5 wherein said support structure comprises a first portion for supporting said first end of said pivoting structure and a second portion for supporting said second end of said pivoting structure and wherein said first portion is said coil support.

9. The pivoting device of claim 1 wherein said windings surround a lower portion of said cavity.

10. The pivoting device of claim 8 wherein said cavity has substantially a rectangular cross-section with a long dimension and a short dimension to receive a substantially rectangular shaped permanent magnet having first and second ends, and wherein a long dimension of said permanent magnet extends between said first and second ends and is selected to be either perpendicular to or parallel to said pivoting axis.

11. The pivoting device of claim 10 wherein said coil support has a spool shape with a core member having a cross-section and a race track shaped top member, and wherein said long dimension of said rectangular cavity is perpendicular to the long dimension of said race track shape, and said long dimension is equal to a cross-section dimension of the core member such that no part of said core member of said coil support exists between a portion of said top most windings and said cavity.

12. The pivoting device of claim 10 wherein said coil support has a spool shape with a core member having a cross-section and a race track shaped top member, and wherein said long dimension of said rectangular cavity is perpendicular to the long dimension of said race track shape, such that a reduced thickness of said core member of said coil support in said long dimension exists between a portion of said top most windings and said cavity.

13. The pivoting device of claim 10 wherein said coil support has a spool shape with a core member having a cross-section and a race track shaped top member, and wherein said short dimension of said rectangular cavity is perpendicular to the long dimension of said race track shape and said short dimension is equal to a cross-section dimension of the core member such that no part of said core member of said coil support exists between a portion of said top most windings and said cavity.

14. The pivoting device of claim 10 wherein said coil support has a spool shape with a core member having a cross-section and a race track shaped top member, and wherein said short dimension of said rectangular cavity is perpendicular to the long dimension of said race track shape, such that a reduced thickness of said core member of said coil support in said short dimension exists between a portion of said top most windings and said cavity.

15. The pivoting device of claim 1 wherein said electrical coil is a drive coil for pivoting said pivoting structure.

16. The pivoting device of claim 15 further comprising an electrical signal applied to said drive coil to oscillate said pivoting structure.

17. The pivoting device of claim 16 wherein said drive coil oscillates said pivoting structure at a resonate frequency.

18. The pivoting device of claim 1 wherein said electrical coil is a sensing coil that provides a signal representative of the rotational position of the pivoting structure.

19. The pivoting device of claim 1 wherein said first and second locations on said pivoting structure are at the same position along the length of the pivoting structure such that the functional area is on the front side and the magnet support area and the functional area are back-to-back.

20. The pivoting device of claim 19 wherein said electrical coil is a sensing coil and said support structure comprises a first pair of piezoelectric elements supporting said first end of said elongated hinge layer and a second pair of piezoelectric elements supporting said second end of said elongated hinge layer.

21. The pivoting device of claim 20 further comprising an electrical signal applied to said piezoelectric element to cause pivoting of said pivoting structure.

22. A pivoting device with improved coupling between a permanent magnet and an electrical coil comprising:
- an elongated hinge layer having a front side and a back side and a first end and a second end, said hinge layer defining a pivoting structure comprising a pair of torsional hinges extending along a pivot axis, a magnet support area at a first location on said back side of said pivoting structure, and a functional area at a second location of said pivoting structure, said pivoting structure supported by said torsional hinges so as to pivot about said pivot axis;
- a permanent magnet attached to said hinge layer at said magnet support area on said back side;
- a coil support having a top member with a top surface and a lower surface, a bottom member with an upper surface and a core member between said top member and said bottom member, said top surface of said top member defining a cavity extending to a selected depth level, and said lower surface of said top member, said upper surface of said bottom member and said core member defining a windings area;
- a multiplicity of electrical windings in said windings area, said electrical windings having top most windings at a level no lower than, the selected depth of said cavity; and
- a support structure for supporting said pivoting structure such that said permanent magnet attached to said hinge layer is located at least partially within said cavity.

23. The pivoting device of claim 22 wherein said selected depth extends to a depth equal to or below the lower surface of said top member.

24. The pivoting device of claim 22 wherein said selected depth extends to a depth equal to or above the lower surface of said top member.

25. A pivoting device with improved coupling between a permanent magnet and an electrical coil comprising:
- a pair of elongated members, each one of said pair extending along a rotational axis, and having a first end and a second end;
- a support area having a front side and a back side and said support area attached to said first end of each one of said pair of elongated members such that said pivoting device rotates about said rotational axis;
- a permanent magnet attached to said back side of said support area and a mirror surface at said front side of said support area;
- a coil support having a top surface defining a cavity with a selected depth level, said coil support further defining a windings area;
- a multiplicity of electrical windings in said windings area, said electrical windings having top most windings at substantially the same level as the selected depth of said cavity; and
- a support structure for supporting said second ends of said elongated members such that said permanent magnet attached to said functional support area is located at least partially within said cavity, and said second ends of said elongated members being attached to said support structure such that said elongated members function as torsional hinges for rotating said pivoting device with said attached permanent magnet and said mirror surface.

\* \* \* \* \*